(12) United States Patent
Dittrich et al.

(10) Patent No.: US 6,687,023 B1
(45) Date of Patent: Feb. 3, 2004

(54) DATA PROCESSING SYSTEM AND METHOD FOR PRODUCING SHIFTED-ELEMENT HALFTONE SCREENS

(75) Inventors: Danielle Dittrich, Longmont, CO (US); Larry Ernst, Longmont, CO (US); Gerhard Robert Thompson, Wappingers Falls, NY (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/550,780

(22) Filed: Apr. 17, 2000

(51) Int. Cl.$^7$ .......................... H04N 1/403; H04N 1/405
(52) U.S. Cl. .................... 358/3.13; 358/3.2; 358/3.22
(58) Field of Search ................ 358/3.06, 3.13, 358/3.14, 3.16, 3.2, 3.21, 3.22, 465, 466, 534, 535, 536; 382/270

(56) References Cited

U.S. PATENT DOCUMENTS

| | | | |
|---|---|---|---|
| 5,107,349 A | 4/1992 | Ng et al. | |
| 5,270,835 A | 12/1993 | Urabe et al. | |
| 5,291,310 A | 3/1994 | Levien | |
| 5,382,967 A | 1/1995 | Curry | |
| 5,471,543 A | 11/1995 | Ng et al. | |
| 5,587,811 A | 12/1996 | Liguori | |
| 5,809,177 A * | 9/1998 | Metcalfe et al. | ........... 358/3.22 |
| 5,880,857 A * | 3/1999 | Shiau et al. | ................ 358/465 |
| 5,903,713 A | 5/1999 | Daels et al. | |

FOREIGN PATENT DOCUMENTS

| | | | | |
|---|---|---|---|---|
| JP | 63045974 A | * | 2/1988 | ............ H04N/1/40 |
| JP | 63281566 A | * | 11/1988 | ............ H04N/1/40 |
| JP | 01114159 A | * | 5/1989 | ............ H04N/1/40 |
| JP | 01160258 A | * | 6/1989 | ............ H04N/1/40 |

* cited by examiner

*Primary Examiner*—Scott Rogers
(74) *Attorney, Agent, or Firm*—Scott W. Reid; Bracewell & Patterson, LLP

(57) ABSTRACT

A data processing system and method are described for generating a halftone screened image from an input image. A first threshold matrix is generated which, when utilized to halftone a solid gray input image, generates a first halftoned output image which is a plurality of generally solid vertical lines. The first threshold matrix includes a plurality of matrix elements arranged in a plurality of rows and a plurality of columns. A plurality of groups of the matrix elements are shifted within the first threshold matrix to create a second threshold matrix which, when utilized to halftone the solid gray input image, generates a second halftoned output image which is a checkerboard type pattern of alternating black or white blocks. In one embodiment, groups of the plurality of the rows are shifted horizontally over by at least one adjacent column to generate the second matrix.

18 Claims, 5 Drawing Sheets

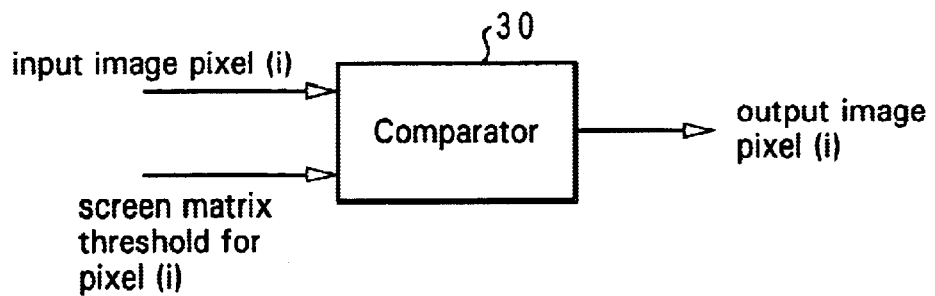
Fig. 1
*Prior Art*
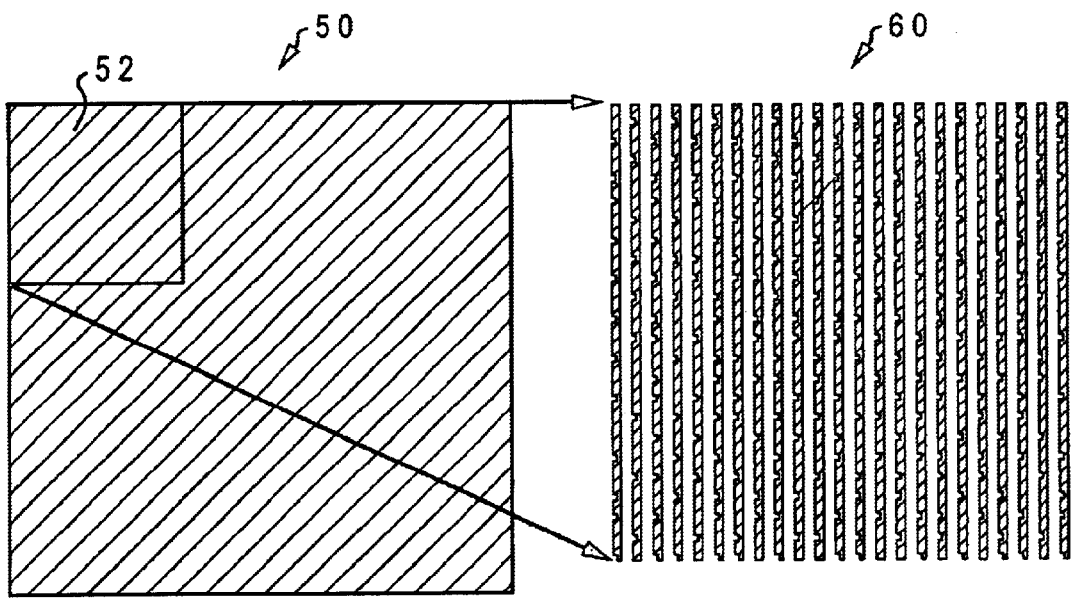
Fig. 3A
*Prior Art*
Fig. 3B
*Prior Art*

DATA PROCESSING SYSTEM AND METHOD FOR PRODUCING SHIFTED-ELEMENT HALFTONE SCREENS

BACKGROUND OF THE INVENTION

1. Field of the Invention

The present invention relates in general to data processing systems and, in particular, to a data processing system and method for producing an improved halftone screen. Still more particularly, the present invention relates to a data processing system and method for generating an improved halftone screen by shifting elements of a threshold matrix.

2. Description of the Related Art

In order to prepare a continuous tone image for printing utilizing a digital printer capable of printing only two tones, i.e. black or white, the image is first processed utilizing a halftone screen. The halftone screen converts the continuous gray tones of the original image into a bi-level image having only two tones.

The halftone screening process consists of using a screen pattern, and comparing the input image with the screen pattern. The screen is usually stored as a fairly small pattern that repeats itself or is replicated by programming. If the value of the image pixel is greater than the corresponding value of the screen cell, a output is printed. If the value of the image pixel is less than or equal to the screen cell value, no output is printed.

FIG. 1 illustrates a high level schematic diagram of an electronic screening process utilizing a threshold matrix in accordance with the prior art as described above. An original input image is input into a comparator 30. The other input into comparator 30 includes threshold values included within the screen threshold matrix. For each pixel in the output image, if the value of the corresponding pixel in the original image is greater than the corresponding threshold matrix value, the output image pixel (i) is printed as a black mark. If the value of the corresponding pixel in the original image is less than or equal to the corresponding threshold matrix value, the output image pixel (i) is not printed, i.e. it is left as a white space. In this manner, the entire original input image is halftoned utilizing the halftone screen by comparing each input value to its corresponding threshold value in the halftone screen matrix.

There are many cell shapes, screen frequencies, and screen angles used in halftoning. A straight line may be used as the cell shape where the line is oriented in the process direction of the printer in order to reduce the appearance of banding in the scan direction caused by the print engine.

This technique presents a variety of problems, however. For example, images containing light gray lines in the process direction may not print correctly. If the lines lie where the screen threshold values are low, they will be visible. If the lines are thin and lie along screen threshold values which are high, they may not be printed at all.

SUMMARY OF THE INVENTION

A data processing system and method are described for generating a halftone screened image from an input image. A first threshold matrix is generated which, when utilized to halftone a solid gray input image, generates a first halftoned output image which is a plurality of generally solid vertical lines. The first threshold matrix includes a plurality of matrix elements arranged in a plurality of rows and a plurality of columns. A plurality of groups of the matrix elements are shifted within the first threshold matrix to create a second threshold matrix which, when utilized to halftone the solid gray input image, generates a second halftoned output image which is a checkerboard type pattern of alternating black or white blocks. In one embodiment, groups of the plurality of the rows are shifted horizontally over by at least one adjacent column to generate the second matrix.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 1 illustrates a high level schematic diagram of an electronic screening process utilizing a threshold matrix in accordance with the prior art;

FIG. 2 illustrates a portion of a threshold matrix utilized to produce a halftoned output image in accordance with the prior art;

FIG. 3A depicts a continuous tone gray scale image in accordance with the prior art;

FIG. 3B illustrates an enlarged halftoned output image obtained by halftoning the continuous tone image of FIG. 3A with the threshold matrix of FIG. 2 in accordance with the prior art;

FIG. 5 depicts a portion of a shifted-line threshold matrix utilized to produce a halftoned output image in accordance with the method and system of the present invention;

DETAILED DESCRIPTION OF A PREFERRED EMBODIMENT

Figure 4A:
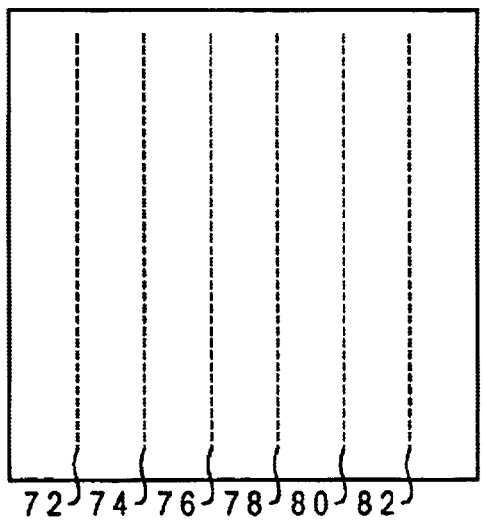
FIG. 4A depicts a continuous tone test pattern including a plurality of vertical lines in accordance with the prior art.

A preferred embodiment of the present invention and its advantages are better understood by referring to FIGS. 1–7 of the drawings, like numerals being used for like and corresponding parts of the accompanying drawings.

The present invention is a method and system for modifying a vertical line halftone screen by shifting some of the elements of the threshold matrix to produce an optimized halftone screen. The halftone screen is a checkerboard type pattern of alternating high threshold values and low threshold values.

A first threshold matrix is generated. The first threshold matrix is utilized to produce a halftoned output image. When the first threshold matrix is utilized to halftone a solid gray input image, an output image is generated which is a plurality of generally solid vertical lines. The first threshold matrix includes a plurality of threshold values arranged in a matrix having a plurality of elements.

A second threshold matrix is generated by shifting groups of the matrix elements within the first threshold matrix. In one embodiment, groups of rows of the matrix are shifted over horizontally by at least one of the columns. Therefore, the values which were previously stored in one column are shifted to be stored in an adjacent column. The rows may be shifted by one of more adjacent columns. Those skilled in the art will recognize that in another embodiment, groups of columns may be shifted down vertically by at least one row.

When the second threshold matrix is utilized to halftone the solid gray input image, a halftoned output image is generated which is a checkerboard type pattern of alternating black or white rectangular blocks.

Figure 2:
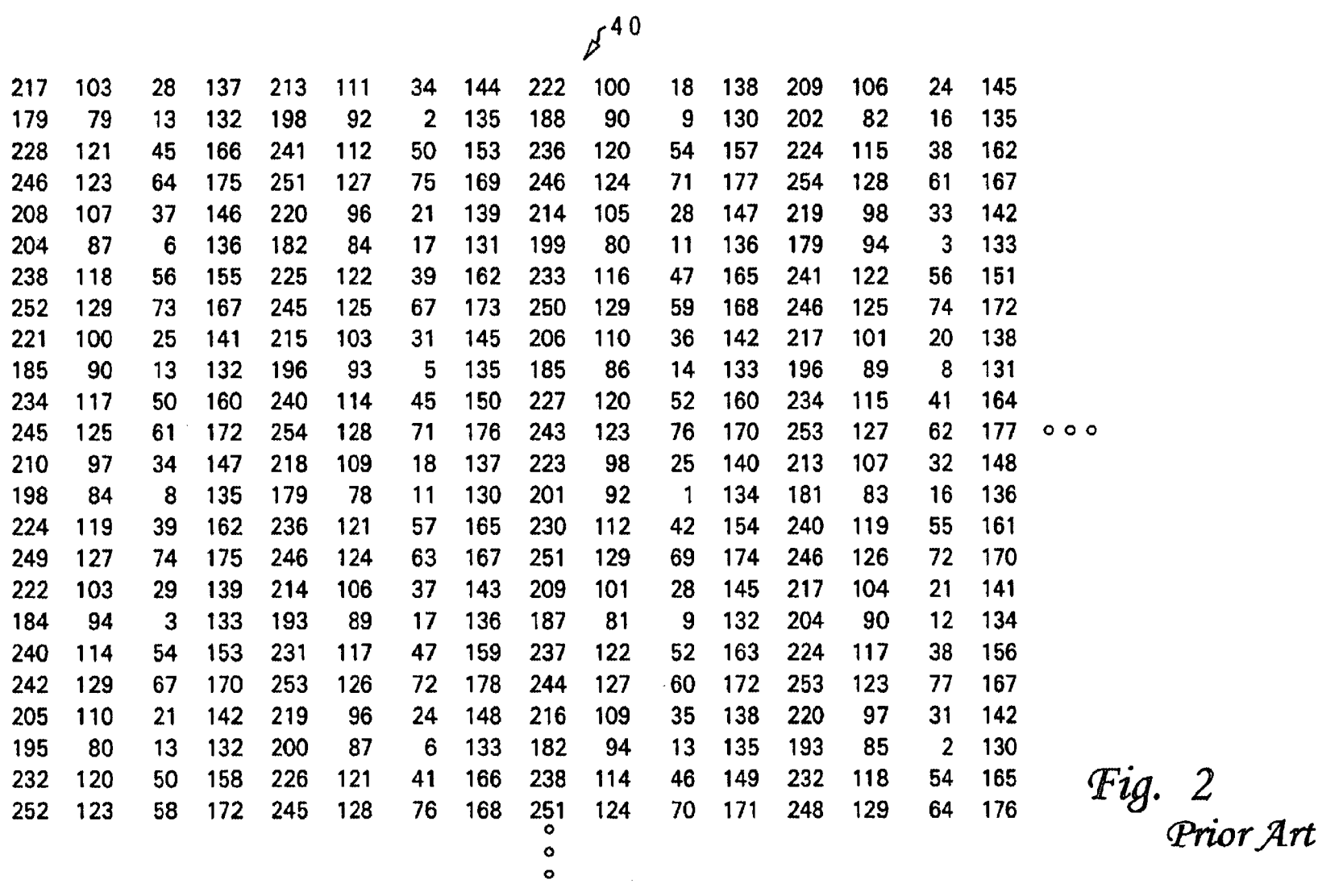

FIG. 2 illustrates a portion of a threshold matrix 40 utilized to produce a halftoned output image in accordance with the prior art. Matrix 40 includes a plurality of matrix elements for storing threshold values ranging from 0 to 255. The value of each pixel of an input image is compared to that pixel's corresponding threshold value. If the value of the input pixel is greater than the corresponding threshold value, a mark will be printed for the pixel in the output image which corresponds to the input pixel. If the value of the input pixel is less than or equal to the corresponding threshold value, no mark will be printed for the pixel in the output image which corresponds to the input pixel.

FIG. 3A depicts a continuous tone gray scale image 50 in accordance with the prior art. Image 50 is utilized as an input image to comparator 30. Matrix 40 may also be input into comparator 30. Image 60 includes a plurality of vertical lines, each separated by a blank line. A blank line is the white space between vertical lines. The vertical and blank lines may each be one or more PELs wide. When comparator 30 receives as its inputs matrix 40 and image 50, a halftoned output image 60 is generated. FIG. 3B illustrates an enlarged halftoned output image 60 obtained by halftoning image 50 with threshold matrix 40. Image 60 is enlarged and represents the output generated from only a portion 52 of image 50.

Figure 4B:
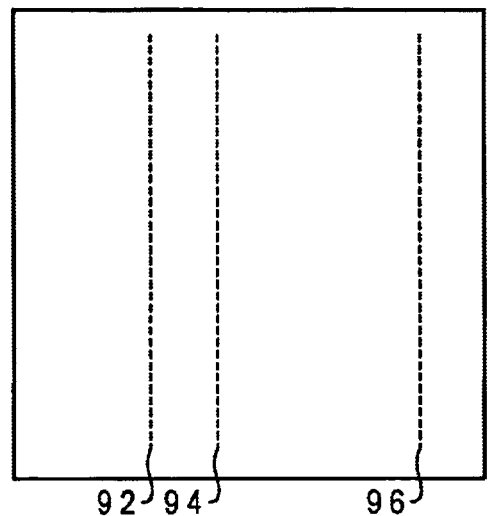
FIG. 4B illustrates a halftoned output image obtained by halftoning the continuous tone test pattern of FIG. 4A with the threshold matrix of FIG. 2 in accordance with the prior art.

FIG. 4A depicts a continuous tone test pattern 70 including a plurality of vertical lines in accordance with the prior art. Test pattern 70 includes a plurality of vertical lines, each of which is a continuous tone. Test pattern 70 includes lines 72, 74, 76, 78, 80, and 82. Test pattern 70 may be used as an input signal to comparator 30 in order to create a halftoned output image. When test pattern 70 and matrix 40 are the inputs to comparator 30, an output image 90 is created as illustrated by FIG. 4B. First threshold matrix 40 is a vertical line halftone screen. When test pattern 70 is used, some of the vertical lines of the test pattern 70 will fall between the vertical lines of the halftone screen and thus will not be displayed in the output image. Therefore, in output image 90, some of the vertical lines will be missing. Output image 90 includes a vertical line 92 which corresponds to test pattern line 74, a vertical line 94 which corresponds to test pattern line 76, and a vertical line 96 which corresponds to test pattern line 82. Output lines which would correspond to test pattern lines 72, 76, and 78 are missing from output image 90.

Figure 5:
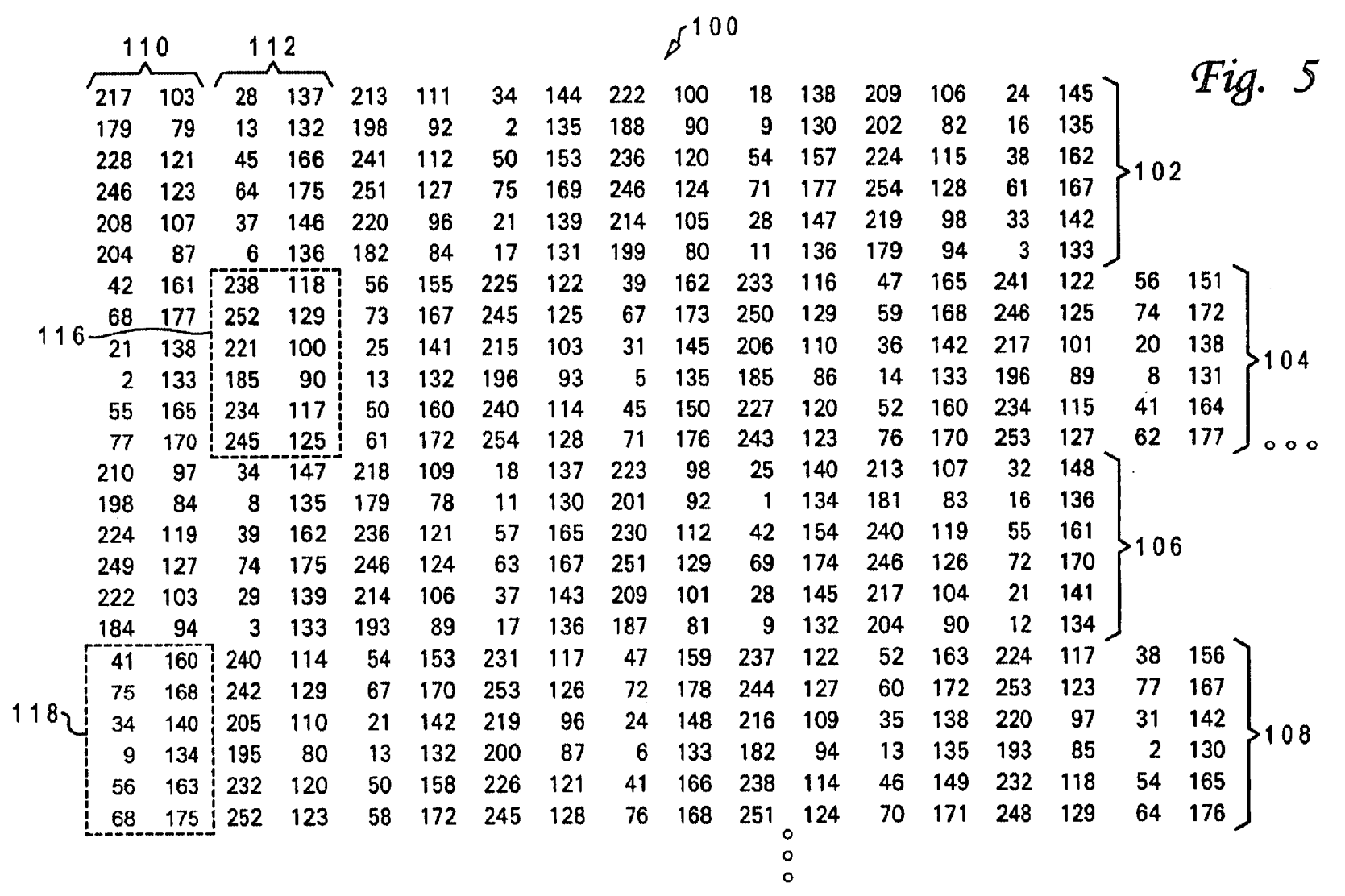

FIG. 5 depicts a portion of a shifted element threshold matrix utilized to produce a halftoned output image in accordance with the method and system of the present invention. Shifted element threshold matrix 100 includes a plurality of threshold values stored in a plurality of matrix elements. The matrix elements are arranged in a plurality of columns and a plurality of rows. Only an upper left corner portion of the entire threshold matrix is depicted. Those skilled in the art will understand that additional threshold values (not shown) are also stored to form the complete threshold matrix.

Matrix 100 includes groups 102, 104, 106, and 108 of rows of the threshold values. By comparing matrix 100 with matrix 40, it becomes apparent that groups 104 and 108 of rows have been shifted from their original position depicted in FIG. 2. Groups 104 and 108 have been shifted by two adjacent columns. For example, threshold values 116 were originally located in two adjacent columns 110. Values 116 are now located in two adjacent columns 112. Similarly, the other values of group 104 have also been shifted as depicted by FIG. 5. The values which were originally located at the right edge of matrix 100 are wrapped around after a group of rows have been shifted and are stored in columns 110 of matrix 100. For example, values 118 were originally stored in matrix locations on the right side of the matrix and are now stored in columns 110.

Figure 6A:
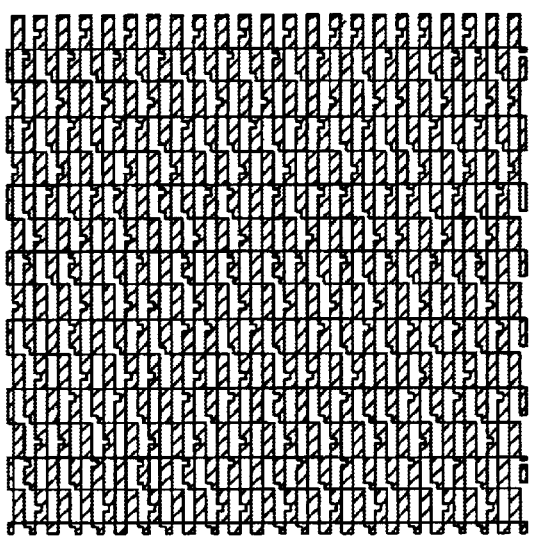
FIG. 6A illustrates an enlarged halftoned output image obtained by halftoning the continuous tone image of FIG. 3A with the shifted-line threshold matrix of FIG. 5 in accordance with the method and system of the present invention.

FIG. 6A illustrates an enlarged halftoned output image 120 obtained by halftoning continuous tone image 50 with shifted-line threshold matrix 100. Output image 120 is a checkerboard type pattern of alternating black or white rectangular blocks. The size of the rectangular blocks depends on the number of matrix elements used to generate the blocks. For example, in matrix 100, two columns by six rows are used to generate a black block alternating with two columns by six rows to generate a white block. Therefore, the resulting blocks are not square.

Figure 6B:
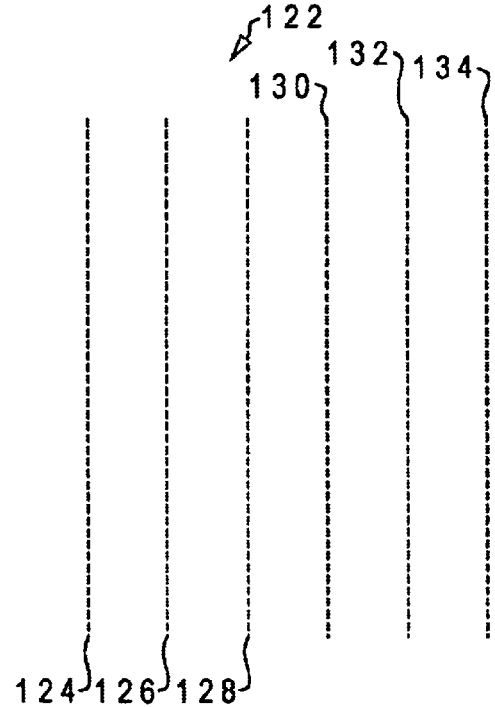
FIG. 6B depicts a halftoned output image obtained by halftoning the continuous tone test pattern of FIG. 4A with the shifted-line threshold matrix of FIG. 5 in accordance with the method and system of the present invention.

FIG. 6B depicts a halftoned output image 122 obtained by halftoning continuous tone test pattern 70 with shifted-line threshold matrix 100. When matrix 100 is used, none of the vertical lines of test pattern 70 will fall between any of the checkerboard type blocks of matrix 100. Therefore, all vertical lines of test pattern 70 will be displayed in output image 122. Output image 122 includes a vertical line 124 which corresponds to test pattern line 72, a vertical line 126 which corresponds to test pattern line 74, a vertical line 128 which corresponds to test pattern line 76, a vertical line 130 which corresponds to test pattern line 78, a vertical line 132 which corresponds to test pattern line 80, and a vertical line 134 which corresponds to test pattern line 82. The vertical lines of the output image 122 appear as dashed lines. None of the input test pattern vertical lines are missing from the output image.

Some of the threshold values of matrix 40 were shifted by n PELs (or n columns) for every m PEL-wide slice (or m rows) of the threshold matrix array. For example, in a 150 lines-per-inch (lpi) halftone screen developed for a 600 dots-per-inch (dpi) printer, the number m would preferably be between four and ten, whereas the number n would preferably be between one and three. Therefore, for each m PEL wide slice of threshold values, the slice is shifted by PELs. The next m PEL wide slice is not shifted. In a preferred embodiment of 150 lpi screens for a 600 dpi printer, the number m is six and the number n is two.

Figure 7:
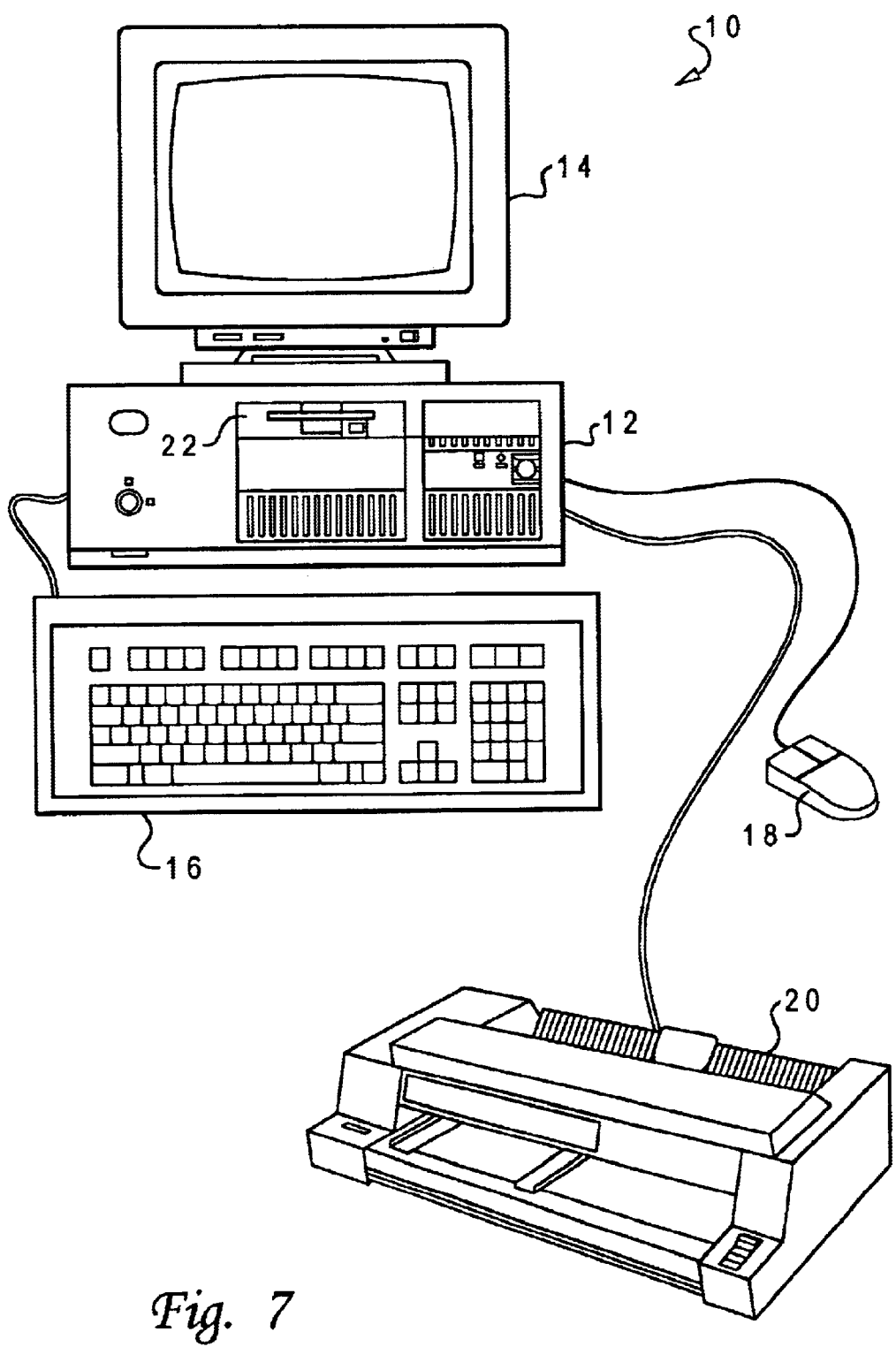
FIG. 7 illustrates a pictorial representation of a data processing system capable of implementing the present invention.

FIG. 7 illustrates a pictorial representation of a data processing system 10 in accordance with the method and system of the present invention. Computer system 10 includes a computer 12, a monitor 14, a keyboard 16, a mouse 18, a printer 20, and a floppy drive 22. Computer system 10 is capable of receiving a variety of different types of inputs from a variety of different types of input devices. Keyboard 16 and mouse 18 are two such types of input devices. Computer system 10 may be implemented utilizing any commercially available computer system. Preferably, the method and system described to produce an improved halftone screen is implemented within printer 20.

While a preferred embodiment has been particularly shown and described, it will be understood by those skilled in the art that various changes in form and detail may be made therein without departing from the spirit and scope of the present invention.

What is claimed is:

1. A method in a computer system for generating a halftone screened image from an input image, said method comprising the steps of:

generating a first threshold matrix which, when utilized to halftone a solid gray input image, generates a first halftoned output image which is a plurality of generally solid axial lines along a first axis, said first threshold matrix including a plurality of matrix elements; and shifting a plurality of groups of said plurality of matrix elements within said first threshold matrix to create a second threshold matrix which, when utilized to halftone said solid gray input image, generates a second halftoned output image which is a checkerboard type pattern of alternating black or white blocks.

2. The method according to claim 1, further comprising the step of said plurality of elements of said first threshold matrix being arranged in a plurality of rows and a plurality of columns.

3. The method according to claim 2, wherein said step of shifting said plurality of groups of said plurality of matrix elements further comprises the step of shifting a plurality of groups of said plurality of rows along a second axis over within said first threshold matrix by at least one of said plurality of columns to create said second matrix, said second axis being perpendicular to said first axis.

4. The method according to claim 3, further comprising the step of said first halftoned output image including a plurality of blank lines, each of said plurality of blank lines separating each of said plurality of axial lines.

5. The method according to claim 4, further comprising the step of generating each of said plurality of axial lines utilizing at least one of said plurality of columns of said first threshold matrix.

6. The method according to claim 5, further comprising the step of generating each of said plurality of blank lines utilizing two adjacent ones of said plurality of columns of said first threshold matrix.

7. The method according to claim 6, further comprising the step of shifting at least one of said plurality of rows along said second axis over within said first threshold matrix by two adjacent ones of said plurality of columns to create said second threshold matrix.

8. The method according to claim 7, further comprising the step of shifting six adjacent ones of said plurality of rows along said second axis over within said first threshold matrix by two adjacent ones of said plurality of columns to create said second threshold matrix.

9. The method according to claim 8, further comprising the steps of:

generating an input test pattern including a plurality of axial lines along said first axis; and generating an output image utilizing said input test pattern and said second threshold matrix, said output image including a plurality of axial lines, wherein each of said plurality of axial lines of said input test pattern correspond to one of said plurality of axial lines of said output image.

10. A computer system for generating a halftone screened image from an input image, comprising:

means for generating a first threshold matrix which, when utilized to halftone a solid gray input image, generates a first halftoned output image which is a plurality of generally solid axial lines along a first axis, said first threshold matrix including a plurality of matrix elements; and means for shifting a plurality of groups of said plurality of matrix elements within said first threshold matrix to create a second threshold matrix which, when utilized to halftone said solid gray input image, generates a second halftoned output image which is a checkerboard type pattern of alternating black or white blocks.

11. The system according to claim 10, further comprising means for said plurality of elements of said first threshold matrix being arranged in a plurality of rows and a plurality of columns.

12. The system according to claim 11, wherein said means for shifting said plurality of groups of said plurality of matrix elements further comprises means for shifting a plurality of groups of said plurality of rows along a second axis over within said first threshold matrix by at least one of said plurality of columns to create said second matrix, said second axis being perpendicular to said first axis.

13. The system according to claim 12, further comprising means for said first halftoned output image including a plurality of blank lines, each of said plurality of blank lines separating each of said plurality of axial lines.

14. The system according to claim 13, further comprising means for generating each of said plurality of axial lines utilizing at least one of said plurality of columns of said first threshold matrix.

15. The system according to claim 14, further comprising means for generating each of said plurality of blank lines utilizing two adjacent ones of said plurality of columns of said first threshold matrix.

16. The system according to claim 15, further comprising means for shifting at least one of said plurality of rows along said second axis over within said first threshold matrix by two adjacent ones of said plurality of columns to create said second threshold matrix.

17. The system according to claim 16, further comprising means for shifting six adjacent ones of said plurality of rows along said second axis over within said first threshold matrix by two adjacent ones of said plurality of columns to create said second threshold matrix.

18. The system according to claim 17, further comprising:

means for generating an input test pattern including a plurality of axial lines along said first axis; and means for generating an output image utilizing said input test pattern and said second threshold matrix, said output image including a plurality of axial lines, wherein each of said plurality of axial lines of said input test pattern correspond to one of said plurality of axial lines of said output image.

* * * * *